Patented Dec. 12, 1939

2,183,268

UNITED STATES PATENT OFFICE 2,183,268

THERAPEUTIC PREPARATION

Rudolf Seiden, Kansas City, Mo.

No Drawing. Application March 6, 1939,
Serial No. 260,110

1 Claim. (Cl. 260—535)

The object of my invention is the production of a therapeutic agent in treating disorders caused by calcium deficiency in the bodies of humans or animals, f. i. tetany, heart weakness, tuberculosis, serious effusions or milk fever, and the like, to be administered per os, or intravenously, intramuscularly, or subcutaneously, in large doses without the necessity of including elements foreign to the body, and entirely free from irritant and toxic properties.

Calcium gluconate has at room temperature a solubility of around 3%, but this is unsuitable for injections. There are a few preparations which are more highly concentrated. They are "stabilized" by adding other substances, most of them containing elements which are foreign to the body and especially to the blood elements, f. i. boric acid, aluminum chloride, etc. Besides, many of these stabilized calcium gluconate solutions have a very low pH value, f. i. borogluconates with pH as low as 3.5, i. e., they are very acid, while blood is neutral resp. slightly alkaline. My compound avoids the irritating effects of calcium gluconate solutions containing acid and other stabilizers foreign to the body (f. i. as mostly used 4% stabilzer for only 1.66 to 1.79% calcium from the gluconate). I produce a stable, non-irritating solution containing, in equimolecular proportion, calcium gluconate and calcium hypophosphite, which does not contain elements foreign to the body. This solution with high calcium content, since not only the gluconate, but also the second part of the new complex salt contains calcium, has a pH value close to that of blood.

20% calcium gluconate solutions stabilized by compounds not containing calcium have a calcium content of only around 1.7%, while, with the help of stabilizers containing calcium, it is possible to produce solutions with a calcium content up to more than 3%. Since only the calcium content of the various known calcium salt compounds is valuable as a remedy, it is important to bring into the body, in a non-irritating form, a relatively high amount of calcium, and also other body elements, especially such ones that may be affected in consequence of the calcium deficiency of the blood, but not ions foreign to the blood composition and especially not such ones that increase the hydrogen-ion concentration. It is known, f. i., that the metabolism of calcium and that of phosphorus is very closely related in the majority of cases of calcium deficiency.

I have found that double calcium salts in solutions of suitable proportions, containing 3% or more calcium gluconate, and calcium hypophosphite are stable, permitting injections into the body of humans or animals without irritation and, if wanted, with a pH value close to that of blood, and also in isotonic or hypertonic concentration.

I have found that the addition of calcium hypophosphite in equimolecular proportion to the calcium gluconate stabilizes such solutions containing up to 60% calcium gluconate. The calcium hypophosphite may be added to the calcium gluconate solution, or it may be added to the dry calcium gluconate, so that both salts may be dissolved in the water at the same time. For example, it is to be noted that a solution containing 1.79% calcium, i. e., the equivalent of a 20% calcium gluconate solution, may be made from 10.01% calcium gluconate and 3.8% calcium hypophosphite.

I believe that this solution of calcium gluconate and calcium hypophosphite, in proportion to their molecular weights, contains a new complex salt, having a pH value close to that of blood, namely 6.2. This new compound has the formula:

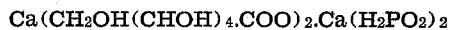
$$Ca(CH_2OH(CHOH)_4COO)_2.Ca(H_2PO_2)_2$$

and may be obtained anhydrous or with crystal water, f. i. with 1 mol. $H_2O$. These crystals are in a very fine powder form, and are white or colorless. I prefer to name the new compound:

Dicalcium-phospho-gluconate as its content is dicalcium-hypophosphite-gluconate.

I made a solution of this new compound by dissolving 10.0 kg. calcium gluconate and 3.8 kg. calcium hypophosphite in 90 liter distilled water and boiling until all of the salts were dissolved. Evaporation losses are replaced and water added to make the total volume of the solution again 100 liter. But it is also possible to dissolve the salts in a smaller amount of water and fill the container later up to 100 liter since the new compound is very soluble. The addition of other substances, f. i., dextrose, in the solution is easily possible. I could put into 100 liter, f. i., 25 or more kg. dextrose or 5 kg. magnesium hypophosphite, etc., without disturbing the stability of the solution. These solutions can be sterilized by adequate means, f. i., by steam under pressure, after bottling, and also by the addition of preservatives as formalin, etc.

I tested my solutions for a long time in keeping the filled bottles in hot rooms, refrigerator, and at normal temperature, and I used shaking equipment and a centrifuge of 3000 R. P. M. without any change in the composition of my solutions. They are, at least for six months, but probably for much longer, stable.

I claim:

A new calcium therapeutic agent containing 10.01 parts by weight calcium gluconate and 3.8 parts by weight calcium hypophosphite in water.

RUDOLF SEIDEN.